Figure 1:
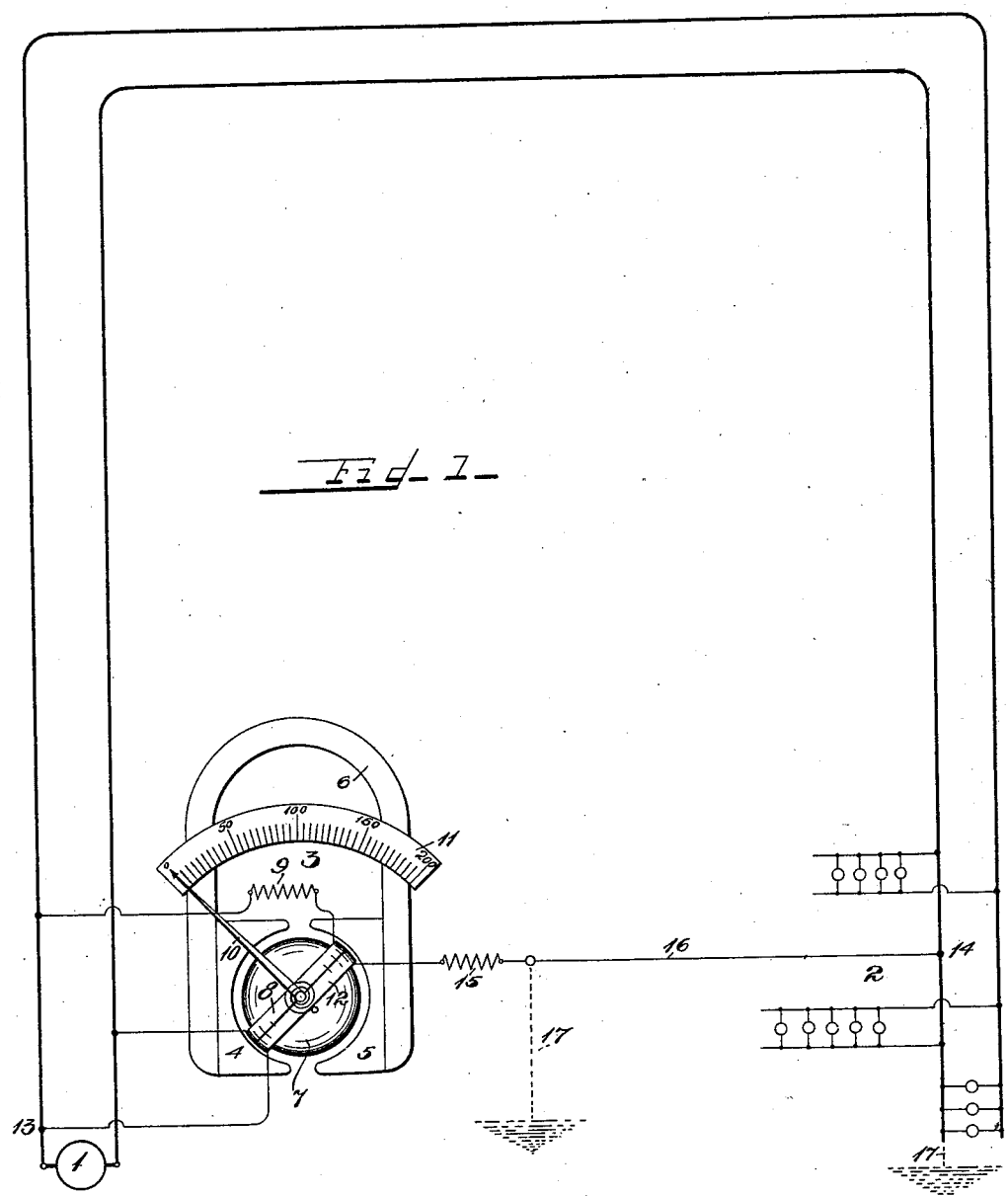

No. 698,685. Patented Apr. 29, 1902.
T. DUNCAN.
ELECTRICAL MEASURING INSTRUMENT.
(Application filed Jan. 2, 1900. Renewed Jan. 6, 1902.)

(No Model.) 2 Sheets—Sheet 1.

Witnesses
Max W. Zabel.
C. J. Schmidt.

Inventor
Thomas Duncan
By Charles A. Brown & Cragg
Attorneys

No. 698,685. Patented Apr. 29, 1902.
T. DUNCAN.
ELECTRICAL MEASURING INSTRUMENT.
(Application filed Jan. 2, 1900. Renewed Jan. 6, 1902.)

(No Model.) 2 Sheets—Sheet 2.

Witnesses
Max W. Zabel.
Chas. J. Schmidt.

Inventor
Thomas Duncan
By Charles A. Brown & Bragg
Attorneys

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

ELECTRICAL MEASURING INSTRUMENT.

SPECIFICATION forming part of Letters Patent No. 698,685, dated April 29, 1902.

Application filed January 2, 1900. Renewed January 6, 1902. Serial No. 88,492. (No model.)

*To all whom it may concern:*

Be it known that I, THOMAS DUNCAN, a citizen of the United States, residing at Chicago, in the county of Cook and State of Illinois, have invented a certain new and useful Improvement in Electrical Measuring Instruments, (Case No. 351,) of which the following is a full, clear, concise, and exact description, reference being had to the accompanying drawings, forming a part of this specification.

My invention relates to compensating voltmeters, and has for its object the provision of improved means for determining the electromotive force at any predetermined point of a system of distribution, my invention enabling me to accurately secure this result.

When the pressure at any point distant from the generating-station is accurately determined, this pressure may be maintained constant by regulation of the impressed pressure to compensate for load changes and the C R drop over the distributing-lines due thereto, which varies directly as the load. A method heretofore frequently employed for measuring the impressed pressure at points distant from a generating-station in both alternating and direct current systems of distribution consisted in extending two pressure-wires from the distant point to the generating-station and there connecting the same with a voltmeter. When the distance to the distant predetermined point is great, the expense of these pressure-wires is significant when a great number of machines are used.

In measuring the potential at distant points in direct-current systems of distribution it has also been the practice to employ what are termed "compound compensating voltmeters" containing two windings, one a pressure-winding connected between the generator-terminals and the other a counter compounding or demagnetizing winding comprising one or more turns of the series or main conductor upon the same voltmeter-spool with the shunt-winding, the current increasing the counter magnetizing effect of the series winding as the load increases to give a resultant magnetizing effect, which indicates the "pressure reduction" in the transmission-lines. The number of turns of the current or series winding is dependent upon the percentage of drop in the mains. It has also been the practice in measuring potential at distant points from a generating-station in alternating-current systems of distribution to employ a voltmeter connected in circuit with the secondary coils of transformers whose primaries are respectively included in series with a main transmission-line and between the transmission-lines. These latter methods, however, are objectionable, since a true compensation is not always effected in the meter for the C R drop, since the effect of the series winding in either case would be the same irrespective of the distance of the load from the generator.

By means of my present invention I am enabled to eliminate one or both of the pressure-wires employed in one of the aforesaid prior methods, to reduce the cost of line construction, and at the same time maintain accuracy in the determination of the pressure at the distant point of distribution where the pressure is to be measured. I am also enabled to overcome the disadvantages of the latter two aforesaid prior methods of determining the pressure at points distant from the generating-station in that I am enabled to accurately determine this pressure irrespective of the distribution of the load.

In applications Serial Nos. 87, 88, 89, 90, 91, and 92, filed of even date herewith, I have set forth measuring apparatus for accomplishing the measurement of pressure at points distant from the generating-stations. In practicing the inventions set forth in the said copending applications I have included a winding of the meter in a pressure-conductor in shunt of one side of a transmission-line or a portion thereof. In practicing my present invention I include one of the meter-coils in bridge between the sides of the transmission-circuit, one connection of the said winding being effected at the generating-station with one side of the transmission-circuit, while the other connection is effected at the distant point where the pressure is to be determined with the other side of the transmission-circuit.

The remaining coil of the meter is connected at the generating-station between the generator-terminals. By a proper calibration of the measuring apparatus the windings thereof will jointly serve to determine the pressure at the distant point.

I will explain my invention more fully by reference to the accompanying drawings, in which—

Figure 2:
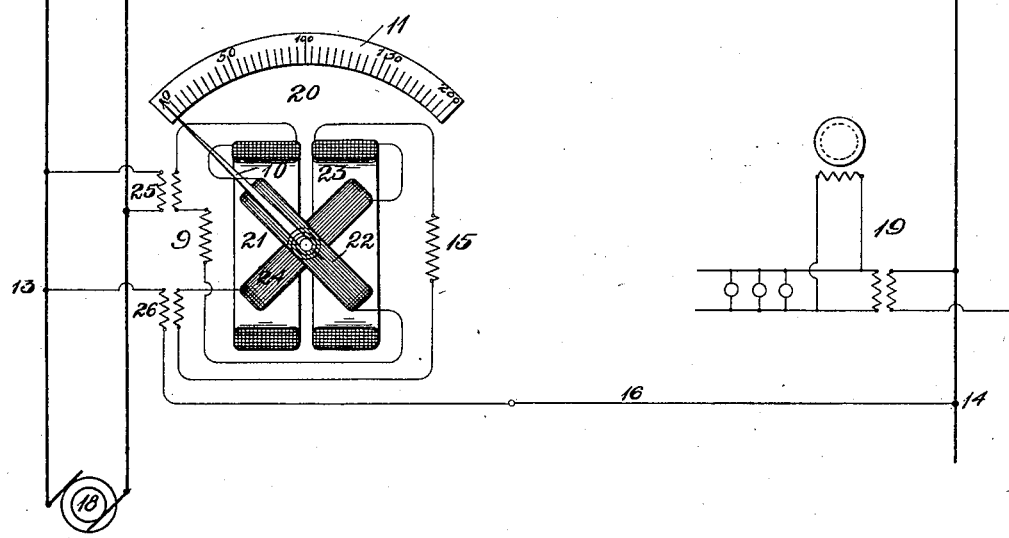

Figure 1 illustrates a system of direct-current distribution with a measuring apparatus connected in circuit therewith in accordance with the invention. Fig. 2 illustrates a system of alternating-current distribution with a measuring apparatus connected in circuit therewith in accordance with the invention.

Referring now more particularly to Fig. 1, I have shown a source of direct current 1 supplying current to translating devices 2. The instrument 3 may be constructed as shown, two field-poles 4 5, of soft iron, being preferably provided, a permanent horseshoe-magnet 6 being preferably employed, upon the ends of which said pole-pieces are secured. An iron core 7, which is preferably stationary, is disposed between the poles. A coil 8 of fine wire, mounted upon a rotatable shaft, surrounds the iron core and is disposed between the pole-pieces, this coil being included in circuit between the generator-terminals, a resistance 9, extraneous to the said coil, being included in the same cross-conductor therewith to prevent waste of current through the said coil. A torque is thus produced proportional to the pressure impressed by the generator upon the transmission-mains. Torsional springs may be provided in the well-known way to oppose the torques of the instrument. I have shown a pointer 10, mounted to swing with the coil, and a scale 11, upon which the measurements may be read. A second coil 12 is mechanically coupled with the aforesaid coil, the latter coil being preferably mounted upon the same shaft with the coil 8. A coil 12 may be included in bridge between the transmission-mains, in this instance between the separated points 13 and 14 at the generator and at a distant point of the transmission system, respectively, an extraneous resistance 15 being preferably adapted for inclusion in the same circuit with the said coil. I have shown a metallic conductor 16 for connecting the points 13 and 14. A part of this pressure-conductor may be replaced by the ground connections 17. The point 14 may be at the center of distribution, at the extreme end of the system of distribution, at a point between the extreme end and the center of distribution, or at any other point distant from the generating-station.

In Fig. 2 an alternating-current generator 18 is shown as supplying current to translating devices 19. The instrument 20 may be constructed as shown. The winding of the meter interposed between the generator-terminals is shown as being divided into a stationary field-coil 21 and the revoluble coil 22. The winding interposed between a point near the generator and a distant point of the transmission-line is divided into a stationary field-coil 23 and the revoluble coil 24. The revoluble coils are preferably jointly subjected to the action of each of the fixed coils.

In order to adapt the instrument to the measurement of voltages in alternating-current systems of electrical distribution, the coils thereof are unprovided with iron cores. A pointer 10 moves with the revoluble coil, a scale 11 being provided upon which the pointer may indicate measurements. The coils 21 and 22 are preferably included in series, as are also the coils 23 and 24; but I do not wish to be limited to this series arrangement. A resistance 9, extraneous to the winding composed of the coils 21 and 22, is provided to prevent waste of current, a resistance 15 for like purpose being also included in series with the winding composed of the coils 23 and 24. Torsional springs may be provided in the well-known way to oppose the torques of the instrument shown in Fig. 2.

In Fig. 2 I have shown a system of alternating-current distribution of high electromotive force, and instead of connecting the windings of the meter directly between the mains of the system and the conductor interposed between a point of the transmission-circuit 13 near the generator and a distant point 14 I employ transformers 25 and 26, whose primaries are connected, respectively, between the mains of the system and with the said conductor 16. The winding 12 in Fig. 1 and the winding composed of the coils 23 and 24 in Fig. 2 are each subject to a pressure equal to the generator-pressure minus one-half the $cr$ drop—i. e., $E - \dfrac{CR}{2}$. For example, if the dynamo-pressure is one hundred volts and the total drop over the line to the point 14 is ten volts then a torque will be created proportional to one hundred minus five, or ninety-five volts, the five volts being one-half of the total drop over the lines. When there is no load upon the system, a torque is exerted by each of these windings receiving current from conductor 16 proportional to the impressed pressure. As load is put upon the system torque is created by the said windings, which varies directly as the difference between the impressed pressure and one-half the CR drop. I preferably so adjust the windings of each instrument that the winding receiving current from each conductor 16 will produce relatively twice the torque for a given pressure impressed at its terminals than that caused by the winding subject to the generator-pressure. This may be accomplished in any well-known way, as by adjustment of the resistance 15 or by changing the number of turns of the winding. The windings of the instrument create opposing torques, and when the instrument is adjusted as specified a result is secured which may be best explained mathematically as follows: The torque due to the winding subject to the impressed pressure is proportional to E. The torque due to the winding receiving current from conductor 16 is proportional to $2(E-\frac{CR}{2})$. As these torques act in opposite directions, a resultant torque is created, which is proportional to $$2(E-\frac{CR}{2})-E=2E-CR-E=E-CR=E',$$

the pressure at the distant point 14.

I have herein shown a system of direct-current distribution and a system of alternating-current distribution, and the claims relate to either.

It is obvious that changes may readily be made in the apparatus of my invention without departing from the spirit thereof, and I do not, therefore, wish to be limited to the precise construction shown; but,

Having thus described my invention, I claim as new and desire to secure by Letters Patent—

1. In a system of electrical distribution, the combination with a transmission-circuit, of a voltmeter having a winding interposed between points of the circuit having unlike differences of potential, the said winding being interposed between the sides of the circuit, substantially as described.

2. In a system of electrical distribution, the combination with a generator, of a transmission-circuit, and a voltmeter having a winding interposed between a point near the generator and a distant point of the transmission-line, the said winding being connected between points of the transmission-circuit having unlike differences of potential, the said winding being interposed between the sides of the circuit, substantially as described.

3. In a system of electrical distribution, the combination with a generator, of a transmission-circuit, and a voltmeter having one winding interposed between the generator-terminals and a second winding interposed between points of the circuit having unlike differences of potential, the latter winding being interposed between the sides of the circuit, substantially as described.

4. In a system of electrical distribution, the combination with a generator, of a transmission-circuit, and a voltmeter having one winding interposed between the generator-terminals and a second winding interposed between points of the circuit having unlike differences of potential, the latter winding being interposed between the sides of the circuit, each circuit of the meter including a movable coil, said coils being mechanically coupled to jointly effect a single measurement, substantially as described.

5. In a system of electrical distribution, the combination with a generator, of a transmission-circuit, and a voltmeter having one winding interposed between the generator-terminals and a second winding interposed between points of the circuit having unlike differences of potential, the latter winding being interposed between the sides of the circuit, each circuit of the meter including a movable coil, said coils being mechanically coupled to jointly effect a single measurement, the torques due to the said windings opposing each other, substantially as described.

6. In a system of electrical distribution, the combination with a generator, of a transmission-circuit, a voltmeter having one winding interposed between the generator-terminals and a second winding interposed between points of the circuit having unlike differences of potential, the latter winding being interposed between the sides of the circuit, each circuit of the meter including a movable coil, said coils being mechanically coupled to jointly effect a single measurement, the torques due to the said windings opposing each other, a pointer movable with the windings, and a scale upon which the pointer may indicate measurements, substantially as described.

7. In a system of electrical distribution, the combination with a generator, of a metallic transmission-circuit, and a voltmeter having one winding interposed between the generator-terminals and a second winding interposed between points of the circuit having unlike differences of potential, the latter winding being interposed between the sides of the circuit, substantially as described.

8. In a system of electrical distribution, the combination with a generator, of a metallic transmission-circuit, and a voltmeter having one winding interposed between the generator-terminals and a second winding interposed between points of the circuit having unlike differences of potential, the latter winding being interposed between the sides of the circuit, each circuit of the meter including a movable coil, said coils being mechanically coupled to jointly effect a single measurement, substantially as described.

9. In a system of electrical distribution, the combination with a generator, of a metallic transmission-circuit, and a voltmeter having one winding interposed between the generator-terminals and a second winding interposed between points of the circuit having unlike differences of potential, the latter winding being interposed between the sides of the circuit, each circuit of the meter including a movable coil, said coils being mechanically coupled to jointly effect a single measurement, the torques due to the said windings opposing each other, substantially as described.

10. In a system of electrical distribution, the combination with a generator, of a metallic transmission-circuit, a voltmeter having one winding interposed between the generator-terminals and a second winding interposed between points of the circuit having unlike differences of potential, the latter winding being interposed between the sides of the circuit, each circuit of the meter including a movable coil, said coils being mechanically coupled to jointly effect a single measurement, the torques due to said windings opposing each other, a pointer movable with the windings, and a scale upon which the pointer may indicate measurements, substantially as described.

11. In a system of electrical distribution, the combination with a generator, of a transmission-circuit, and a voltmeter having one winding interposed between the generator-terminals and a second winding interposed between a point of the circuit near the generator and a second, distant point of the transmission-circuit, the latter winding being interposed between the sides of the circuit, substantially as described.

12. In a system of electrical distribution, the combination with a generator, of a transmission-circuit, and a voltmeter having one winding interposed between the generator-terminals and a second winding interposed between a point of the circuit near the generator and a second distant point of the transmission-circuit, the latter winding being interposed between the sides of the circuit, each circuit of the meter including a movable coil, said coils being mechanically coupled to jointly effect a single measurement, substantially as described.

13. In a system of electrical distribution, the combination with a generator, of a transmission-circuit, and a voltmeter having one winding interposed between the generator-terminals and a second winding interposed between a point of the circuit near the generator and a second, distant point of the transmission-circuit, the latter winding being interposed between the sides of the circuit, each circuit of the meter including a movable coil, said coils being mechanically coupled to jointly effect a single measurement, the torques due to said windings opposing each other, substantially as described.

14. In a system of electrical distribution, the combination with a generator, of a transmission-circuit, a voltmeter having one winding interposed between the generator-terminals and a second winding interposed between a point of the circuit near the generator and a second, distant point of the transmission-circuit, the latter winding being interposed between the sides of the circuit, each circuit of the meter including a movable coil, said coils being mechanically coupled to jointly effect a single measurement, the torques due to the said windings opposing each other, a pointer movable with the windings, and a scale upon which the pointer may indicate measurements, substantially as described.

In witness whereof I hereunto subscribe my name this 20th day of December, A. D. 1899.

THOMAS DUNCAN.

Witnesses:
WILLIAM F. MEYER,
JAMES W. DALTON.